United States Patent
Reynolds et al.

(10) Patent No.: US 7,570,177 B2
(45) Date of Patent: Aug. 4, 2009

(54) AIRCRAFT TERRAIN WARNING SYSTEMS AND METHODS

(75) Inventors: Zachary Reynolds, Peoria, AZ (US); Richard Ridenour, Glendale, AZ (US); Cyro Stone, Peoria, AZ (US); Stacey Rowlan, Phoenix, AZ (US)

(73) Assignee: Aviation Communication & Surveillance Systems LLC, Phoenix, AZ (US)

(*) Notice: Subject to any disclaimer, the term of this patent is extended or adjusted under 35 U.S.C. 154(b) by 0 days.

(21) Appl. No.: 11/471,401

(22) Filed: Jun. 19, 2006

(65) Prior Publication Data

US 2006/0290531 A1 Dec. 28, 2006

Related U.S. Application Data

(63) Continuation of application No. 10/326,544, filed on Dec. 20, 2002, now Pat. No. 7,064,680.

(51) Int. Cl.
G08G 5/04 (2006.01)

(52) U.S. Cl. .......................... 340/961; 340/970; 701/9; 701/14; 701/301

(58) Field of Classification Search ................. 340/961, 340/963, 970, 968; 701/9, 4, 14, 301; 342/65
See application file for complete search history.

(56) References Cited

U.S. PATENT DOCUMENTS

| | | |
|---|---|---|
| 4,312,041 A | 1/1982 | DeJonge |
| 4,538,229 A | 8/1985 | Baltzer et al. |
| 4,812,990 A | 3/1989 | Adams et al. |
| 5,220,322 A | 6/1993 | Bateman et al. |
| 5,442,556 A | 8/1995 | Boyes et al. |
| 5,488,563 A | 1/1996 | Chazelle et al. |
| 5,594,414 A | 1/1997 | Namngani |
| 5,864,307 A | 1/1999 | Henley |
| 5,936,552 A | 8/1999 | Wichgers et al. |
| 6,088,654 A | 7/2000 | Lepere et al. |
| 6,154,151 A | 11/2000 | McElreath et al. |
| 6,317,663 B1 | 11/2001 | Meunier et al. |
| 6,347,263 B1 | 2/2002 | Johnson et al. |
| 6,456,940 B1 | 9/2002 | Higgins |

FOREIGN PATENT DOCUMENTS

DE 100 05 175 A1 8/2001

*Primary Examiner*—Brent Swarthout
(74) *Attorney, Agent, or Firm*—Allen J. Moss; Squire, Sanders & Dempsey L.L.P.

(57) ABSTRACT

Methods and systems are disclosed for preventing aircraft collisions with forward looking terrain avoidance (FLTA) functionality based on a terrain avoidance profile used to evaluate potential terrain threats based on the projected flight path of an aircraft in flight, and a clear terrain profile to determine whether the terrain threat has been cleared. If the terrain avoidance profile conflicts with terrain, a collision threat may exist whereby the pilot is notified and a terrain avoidance maneuver is executed. During the terrain avoidance maneuver the clear terrain profile extends in a direction substantially parallel with the horizon at or near the present altitude of the aircraft to check whether it is safe to return to the previous flight path angle or otherwise end the terrain-avoiding maneuver. When the clear terrain profile no longer conflicts with the terrain threat, a terrain clear indicator is then issued to the pilot.

22 Claims, 7 Drawing Sheets

AIRCRAFT TERRAIN WARNING SYSTEMS AND METHODS

CROSS REFERENCE TO RELATED APPLICATIONS

This application is a continuation of and claims priority to U.S. application Ser. No. 10/326,544, filed Dec. 20, 2002, now U.S. Pat. No. 7,064,680, in the name of the same inventors and having the same title, all of which is incorporated herein by reference.

DESCRIPTION OF THE INVENTION

1. Field of the Invention

The present invention generally relates to methods and systems for preventing collisions between aircraft and terrain. More particularly, the present invention defines terrain warning systems and methods that inform a pilot to avoid collision with terrain and when hazardous terrain has been traversed.

2. Background of the Invention

Ground Proximity Warning Systems (GPWS), Ground Collision Avoidance Systems (GCAS) and/or Terrain Awareness and Warning Systems (TAWS), are used in aircraft to inform pilots or other flight crewmembers of likely or imminent collision with terrain. For simplicity, these and other system for warning pilots of potential collision with terrain are collectively and individually referred to herein as TAWS. TSO-C151a (Technical Standard Order), which is fully incorporated herein by reference including its Appendices, and RTCA DO-161A, prescribe minimum operational performance standards for TAWS equipment in the United States.

TAWS includes a Forward Looking Terrain Avoidance (FLTA) function which looks ahead of an aircraft along and below the aircraft's lateral and vertical flight path and provides alerts to a flight crew if a potential Controlled Flight Into Terrain (CFIT) threat exists. CFIT is an aircraft accident where a completely airworthy aircraft is inadvertently flown into terrain (which may include man-made obstacles) or water. In the United States, Class A TAWS equipment must provide terrain information on a display system such as a weather radar display or other video output device. In such a system, visual and aural signals are provided to a flight crew for both caution and warning alerts in one or more of the following situations:

(1) excessive rate of descent;
(2) excessive closure rate to terrain;
(3) negative climb rates/loss of altitude after take-off;
(4) flight into terrain when not in landing configuration;
(5) excessive downward deviation from an ILS (Instrument Landing System) glideslope;
(6) an FLTA function that looks ahead of the aircraft along and below the lateral and vertical flight path and provides suitable alerts if a potential CFIT exists; and
(7) a Premature Descent Alert (PDA) function that determines if an airplane is hazardously below the normal (typically three degree) approach path for the nearest runway.

A "caution alert" as used herein is provided when a potentially hazardous flight condition is encountered, immediate crew/pilot attention is required, and a potential for crew/pilot action exists. In a TAWS, a typically caution alert is in the form of an audible notification of a flight condition, e.g., "terrain ahead" and/or corresponding visual indicators of the flight condition such as an amber or yellow light on a display. A "warning alert" as used herein is provided when a potentially hazardous flight condition is encountered and immediate crew/pilot action is required to avoid a hazardous flight condition. Typically, a warning alert may be in the form of an audible instruction to take action (e.g., "terrain, terrain; pull up, pull up") and/or corresponding visual indicator (e.g., a red light or symbol on a cockpit display) notifying a crew or pilot that action is required to avoid an imminent threat. In most instances a warning alert is only provided after a caution alert is provided. The differences between these alert types are made primarily to distinguish between severities of threats from terrain that one may encounter during flight.

Forward Looking Terrain Avoidance (FLTA) in TAWS uses a "look ahead" or "sensor" profile for determining when to generate terrain caution and/or warning alerts. These sensor profiles typically include a projection of the aircraft's future position using two or more segments including a response segment, which projects the flight path of the aircraft a certain length of time in front of an aircraft, and a climb profile, which projects an angle of increasing elevation that the aircraft might take to avoid terrain. In a spatial sense, the climb profile is connected at the forward end of the response segment. This look ahead profile is compared with terrain data to determine whether an aircraft is encountering a terrain threat. If terrain data intersects the TAWS look ahead profile, then a caution or warning alert is given to the flight crew depending on the severity of the threat. The primary difference between generation of a caution alert and a warning alert is the length of the response segment in a look ahead profile. That is, an increased length of time is used for a caution alert, whereas a smaller length of time for response is used for a warning alert.

The climb profile is a prediction of the change in aircraft altitude for overcoming terrain threats and is based, at least in part, on an aircraft climb angle. A "climb angle" is the angle of a flight path measured from the horizon.

Fixed profiles used in some conventional FLTA processing may not take into account the actual climb angle obtainable by a particular aircraft, but rather utilize a fixed, conservative climb angle that is presumed to be safe for all types of aircraft that may utilize a TAWS. Accordingly, some conventional sensor profiles are static by nature and do not account for certain differences between types of aircraft or take into account actual performance characteristics of the aircraft in which the TAWS is present. Variances between, for example, thrust or aerodynamic characteristics and performance of aircraft can significantly alter the true climb angle that may be utilized by an aircraft for escaping a terrain collision threat. Consequently the true climb angle of a particular aircraft may not match the predicted climb profile used with conventional FLTA.

The conventional approach, using a fixed climb profile, has a drawback that the climb profile may not be suitable for all aircraft. For example, if an aircraft is unable to attain a climb angle predicted in the look ahead profile, then the aircraft may not be able to sufficiently avoid a terrain threat when a warning alert is sounded. Alternatively, if the climb profile is too conservative for the actual climb angle obtainable by an aircraft, alerts may be generated before any respective caution or warning alert is necessary or desired. These unnecessary alerts are referred to as "nuisance alerts," and are generally desired to be minimized. For the foregoing reasons, it is desirable to provide a terrain avoidance profile that considers the specifications and recently demonstrated characteristics of the aircraft for which it is used.

Referring now to FIG. 1, an example of conventional TAWS functionality will be described. The Forward Looking Terrain Avoidance (FLTA) function of the TAWS in aircraft 10 compares numerical representations of look ahead profile 15 (also referred to herein as a "terrain avoidance profile")

with numerical representations of terrain features, for example, mountain 50, stored in a database. For the sake of simplicity, the FLTA described herein relates to the terrain avoidance profiles in association with generating a warning alert. However, profile 15, and the inventive profiles discussed hereafter, may be used for either a caution or warning alert. Notwithstanding, when profile 15 of aircraft 10 at position (A) encounters terrain feature 50, the TAWS in aircraft 10 issues a warning alert including aural alert 25 such as "Terrain, pull up, pull up." The pilot of aircraft 10 reacts to this warning by following the recommendation of aural alert 25 through positions (B) and (C) until profile 15 no longer conflicts with terrain feature 50. At position (D), aural alert 25 ceases and the pilot may stop increasing the elevation of aircraft 10 to avoid terrain 50, or "level off."

This conventional approach to TAWS suffers from one or more of the following problems. When visual inspection by a pilot is impossible or impaired, e.g., when flying in fog, darkness, or other visual impairment condition, a pilot of aircraft 10 may be entirely surprised by a terrain warning alert. Since the terrain warning alert provides no indicia of how fast to "pull up" or how much to "pull up," the pilot will most likely enact the most rigorous increase in elevation possible. Moreover, because aural alert 25 continues to sound until aircraft 10 reaches an elevation safe enough to clear terrain 50, the pilot will continue the most rigorous increase in elevation possible until the terrain is cleared. This type of extreme avoidance maneuver can: (i) induce aircraft 10 to stall, thereby increasing the chance of collision with the terrain, (ii) lead to injury of passengers, flight crew or cargo or at least an uncomfortable ride due to severe course alterations, and/or (iii) cause unnecessary stress on the pilot and/or damage to aircraft 10. With the conventional methods and systems, a pilot may not realize danger has subsided until the aural alert ceases, even though in reality, a timely response by the pilot and a slight or gradual increase in altitude might avoid collision.

Thus, a need exists for systems and methods, which overcome these and other problems.

SUMMARY OF THE INVENTION

In accordance with an embodiment of the invention, a method is disclosed for preventing controlled flight into terrain, the method comprising providing a first indicator to a pilot of an aircraft that a threat of potential collision with terrain exists, providing a second indicator to the pilot of the aircraft that the threat no longer exists, comparing a terrain avoidance profile with terrain information to determine whether the threat exists, and comparing a clear terrain profile with the terrain information to determine whether the threat no longer exists.

In accordance with another embodiment of the invention, an apparatus is disclosed for monitoring potential aircraft collision threats with terrain, the apparatus comprising a memory storing machine readable code; and a processor when processing the stored machine readable code in the memory is operative to, compare an altitude and a bearing of an aircraft with terrain information to identify a potential collision threat, generate a terrain warning signal when the potential collision threat is identified, compare a forward projection of current aircraft altitude with the terrain information to identify if a terrain threat has been avoided, and generate a terrain clear signal when the terrain threat has been avoided.

In accordance with yet another embodiment of the invention, a system is disclosed for avoiding aircraft collisions with terrain, the system comprising storage means for storing information relating to terrain features; processing means for comparing a terrain avoidance profile with the information stored in the storage means, for generating an alert signal based upon the comparison if the comparison indicates a potential threat, for comparing a clear terrain profile with the information when the alert signal has been generated, and for generating a terrain clear signal when the terrain clearance profile does not conflict with the information.

In accordance with still another embodiment of the invention, a method is disclosed for warning a pilot of situational threats during flying, the method comprising determining that a terrain threat exists with reference to criteria of a first sensor, and determining that the terrain threat has been averted with reference to criteria of a second sensor.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
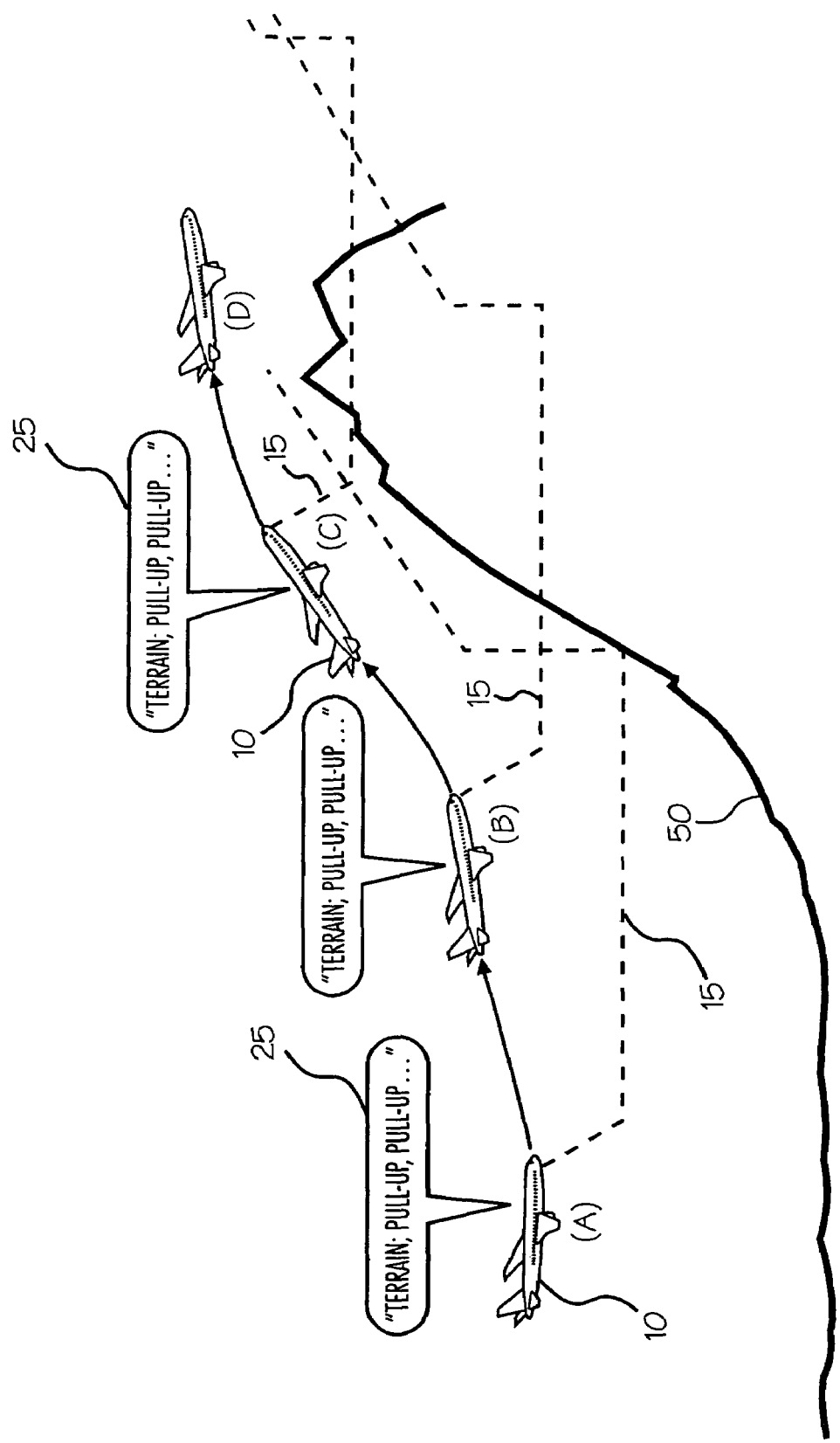
FIG. 1 illustrates an action sequence for a TAWS and method of the related art.
Figure 2:
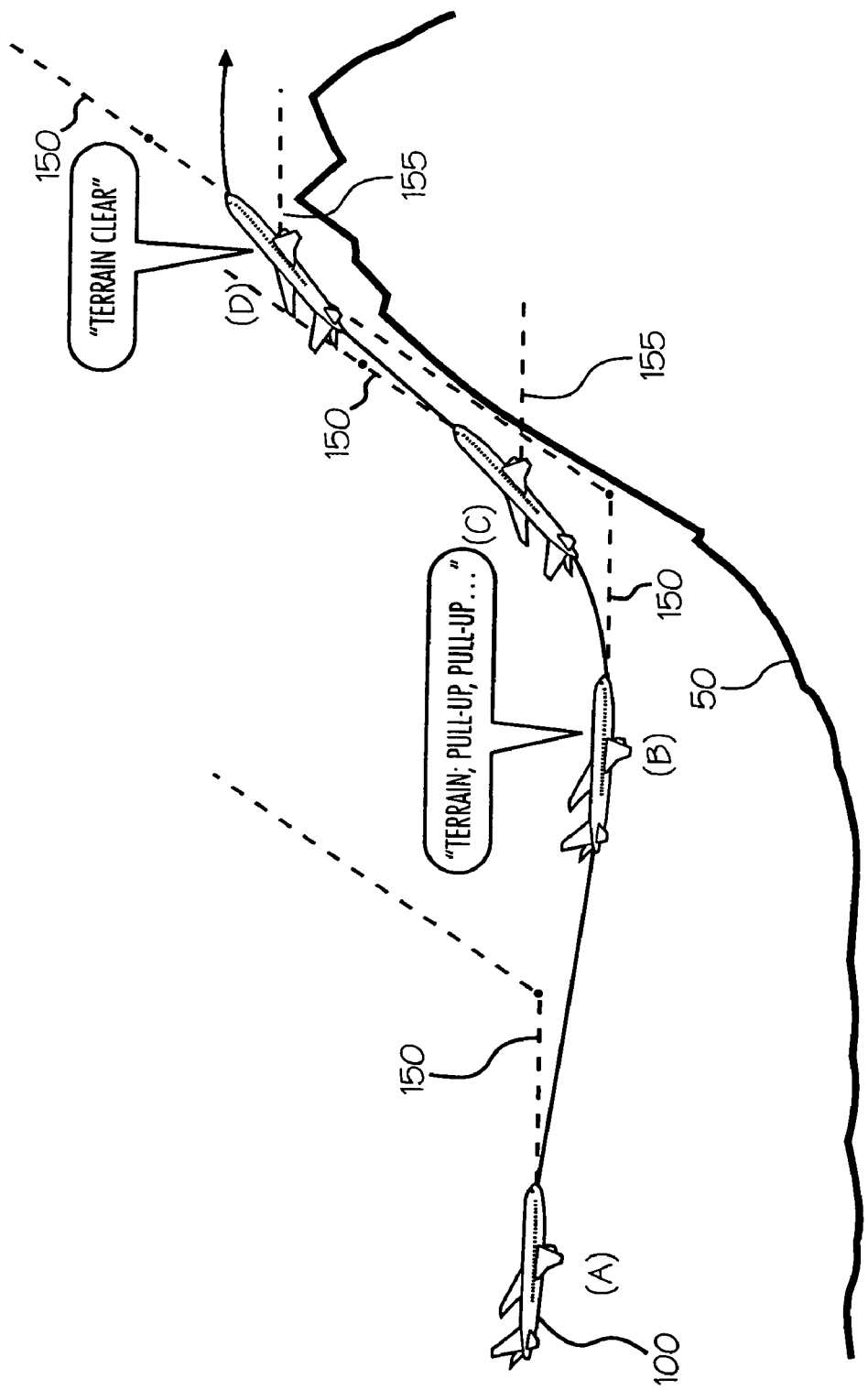
FIG. 2 illustrates an example action sequence for a TAWS and method, in accordance with systems and methods consistent with the present invention.
Figure 6:
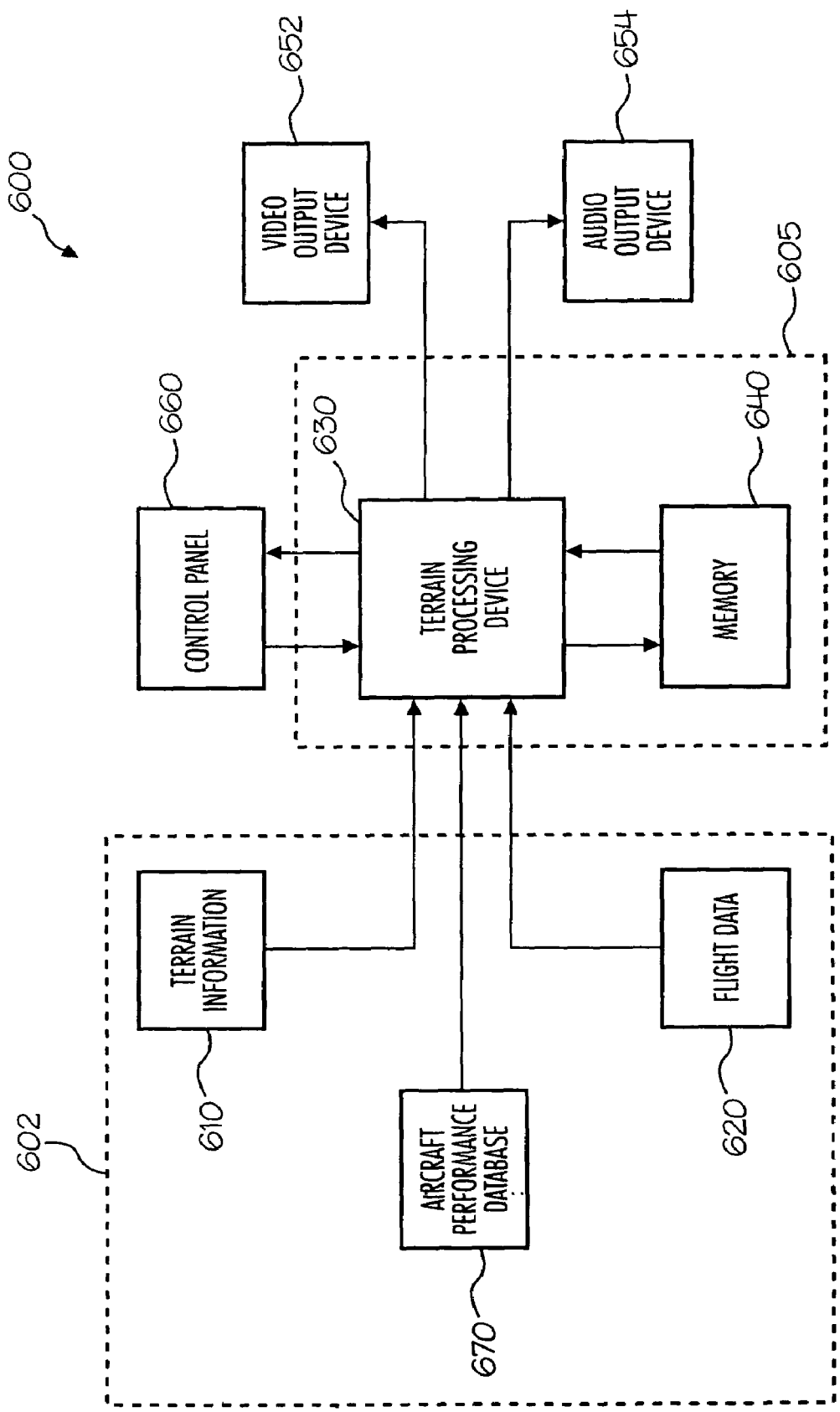
FIG. 6 illustrates a block diagram of a system for preventing aircraft collisions with terrain, in accordance with systems and methods consistent with the present invention.

Turning to FIG. 2, functional aspects of an improved method and system for avoiding collisions between an aircraft and terrain according to one preferred embodiment of the invention will now be described. In the scenario depicted in FIG. 2, aircraft 100 includes an improved TAWS of the present invention (for example, system 600; FIG. 6) having modified Forward Looking Terrain Avoidance (FLTA) capabilities. According to various aspects of the present invention, the modified FLTA in the TAWS of aircraft 100 utilizes a terrain avoidance profile 150 to determine whether a CFIT threat exists. When aircraft 100 moves from position (A) to position (B), terrain avoidance profile 150 intersects the data model of terrain 50, giving rise to a potential terrain threat.

The TAWS in aircraft 100 issues an alert notifying the pilot that a potential terrain collision threat exists. The alert preferably continues until the pilot maneuvers aircraft 100 in a direction where profile 150 no longer conflicts with terrain 50 (for example, imminent collision is avoided at position (C)). At this point, in one preferred embodiment, the TAWS in aircraft 100 preferably ceases the alert when terrain avoidance profile 150 no longer conflicts with terrain 50. This however, does not necessarily mean that a terrain hazard has been successfully traversed or that aircraft 100 may return to its original flight path or level off (for example, return to the climb angle and/or flight path that was pursued before the terrain avoidance maneuver was initiated).

When a terrain alert has been issued and ceases due to a pilot initiating a terrain avoiding maneuver, the improved system having modified FLTA of the present invention will utilize a second sensor profile 155, in addition to sensor profile 150, to determine whether the pilot of aircraft 100 should maintain the terrain avoiding maneuver (for example, whether the aircraft may cease deviating from its original flight path or increasing in altitude). This second profile 155 is referred to herein as a "clear terrain profile." According to one embodiment of the invention clear terrain profile 155 extends in a substantially horizontal direction regardless of the climb angle of aircraft 100.

During a terrain avoidance maneuver, e.g., aircraft 100 at position (C), if clear terrain profile 155 conflicts with the terrain 50, the pilot of aircraft 100 will not be informed that the terrain has been cleared or that the terrain threat has ended. In a modified embodiment of the invention, the pilot or flight crew may be instructed to maintain the terrain-avoiding maneuver (for example, the current climb angle or banking maneuver) using an aural and/or visual indicator. Alternatively, if appropriate, the alert may change from a "warning alert" to a "caution alert" as those terms are defined in TSO-C151a.

When aircraft 100 exceeds the altitude of the terrain 50, plus preferably a minimum safe clearance altitude, clear terrain profile 155 no longer conflicts with terrain 50 and the pilot is notified that the terrain threat has been overcome. This notification may be provided using any form of audio and/or visual indicia that informs the pilot that the potential terrain collision threat has ended. In one embodiment of the invention an aural alert, for example, "Terrain Clear," "Clear of Terrain," "End Terrain Threat" or other similar audible indicator would effectively inform the pilot that it is safe to end the terrain avoidance maneuver (e.g., level off). Preferably, although not mandatory, clear terrain profile 155 includes a built in safety margin of altitude to prevent aircraft 100 from leveling off immediately after surpassing the altitude of terrain 50. Such built in safety margin is discretionary and might be, for example, five hundred feet above any threatening terrain feature or a variable threshold depending on phase of flight or proximity to the nearest airport.

Figure 3:
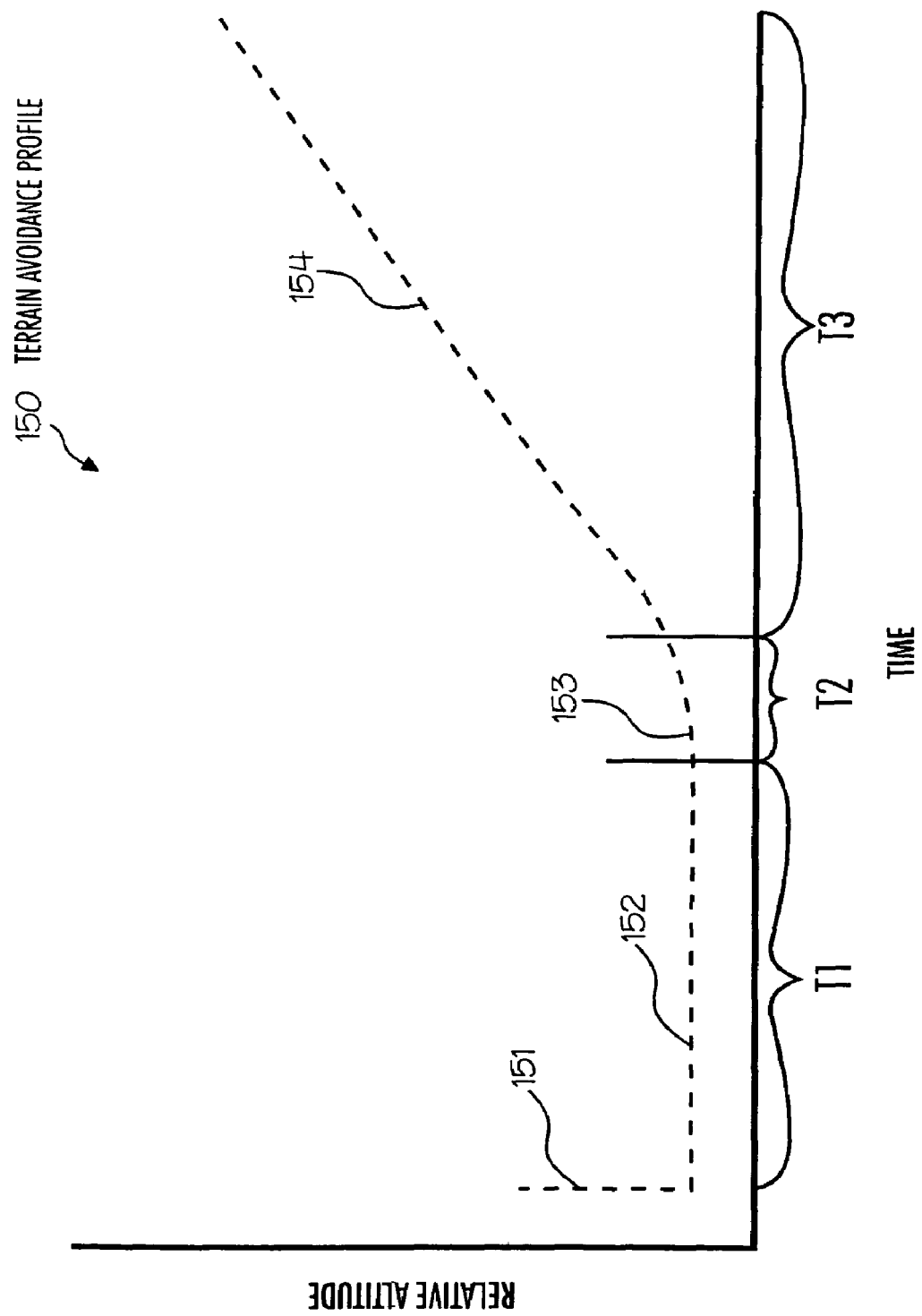
FIG. 3 illustrates an example configuration for a terrain avoidance profile, in accordance with systems and methods consistent with the present invention.

Referring to FIG. 3, an example terrain avoidance profile 150, according to one embodiment of the invention, preferably comprises a multi-segment profile including a minimum clearance segment 151, a pilot response segment 152, an aircraft maneuver segment 153 and an aircraft climb segment 154.

Minimum clearance segment 151 may be included as part of terrain avoidance profile 150 to serve the purpose of providing a minimum safety margin of altitude for safe flight over terrain or Minimum Terrain Clearance Distance (MTCD). Minimum clearance segment 151 may be set for a fixed minimum clearance altitude, e.g., five-hundred feet or be a variable threshold based upon the phase of aircraft flight.

Pilot response segment 152 projects the aircraft's trajectory for a specified amount of time prior to a pilot taking action in response to an alert. Segment 152 essentially projects in the direction of the aircraft's current flight path angle, for a length of time T1. The length of time T1 for pilot response may vary depending on the type of warning involved, e.g., caution or warning, requirements from various airworthiness authorities and/or at the discretion of the party responsible for the aircraft, e.g., commercial airline, etc. In certain preferred embodiments, T1 is twenty seconds for a caution alert and eight seconds for a warning alert.

Aircraft maneuver segment 153 is a model of the pull up behavior of an aircraft in responding to an alert. The length of time T2 for segment 153 may vary based on the theoretical climb vertical speed of an aircraft (Vt), the current vertical speed of the aircraft (Vp) and an assumed acceleration relative to gravity, e.g., 0.5 g as follows:

$$T2=(Vt-Vp)/0.5\ g$$

Climb segment 154 is a model of the predicted climb capability of an aircraft. Essentially segment 154 is a straight segment reflecting the climb angle that may be achieved by an aircraft. Segment 154 has a length of time T3 which may be based on relevant TAWS regulations and requirements. In certain embodiments T3 is one hundred and twelve seconds and may be modified in certain cases depending on, for example, the various CFIT situations discussed previously.

Times T1, T2 and T3 for respective segments in profile 150 are not limited to the specific times or formulas set forth above and consequently, times T1, T2 and/or T3 may be selected or adjusted as desired or set as required by pertinent airworthiness authority requirements or government regulations.

The climb angle for segment 154 is typically set conservatively compared to an expected climb gradient based on performance models of a particular aircraft, for example, ninety percent of the calculated climb gradient. Maneuver segment 153 and climb segment 154 may be modeled after any aircraft's climb maneuver and achievable escape angle used to avoid a terrain threat.

By way of example, segments 153 and 154 may be: (i) fixed (e.g., a fixed six degree climb angle); (ii) based on the published maneuver and climb performance models for a particular aircraft; and/or, to reduce the number of nuisance alerts, preferably (iii) based on published performance models and adjusted using current and/or recently demonstrated flight performance characteristics of the aircraft. Actual aircraft performance characteristics used for calculating a climb gradient profile might include, for example, current aircraft weight (including remaining fuel and/or weapons payload), current ground and/or vertical speeds, thrust, temperature, wind shear, and/or other factors known to affect climb performance and climb angle of an aircraft. Nuisance alerts will be reduced when maneuver segment 153 and climb segment 154 are modeled after actual climb capabilities of an aircraft.

In other embodiments of the present invention, degradations in aircraft performance may be considered in calculating a look ahead profile. For example, by taking into account known deficiencies in an aircraft's performance, such as reductions in engine thrust output as compared to published performance specifications, the climb profile may be adjusted to reflect actual climb capabilities. Consequently, an increased safety margin for an aircraft to avoid terrain may be achieved while at the same time reducing the number of nuisance alerts generated by a TAWS.

Figure 4:
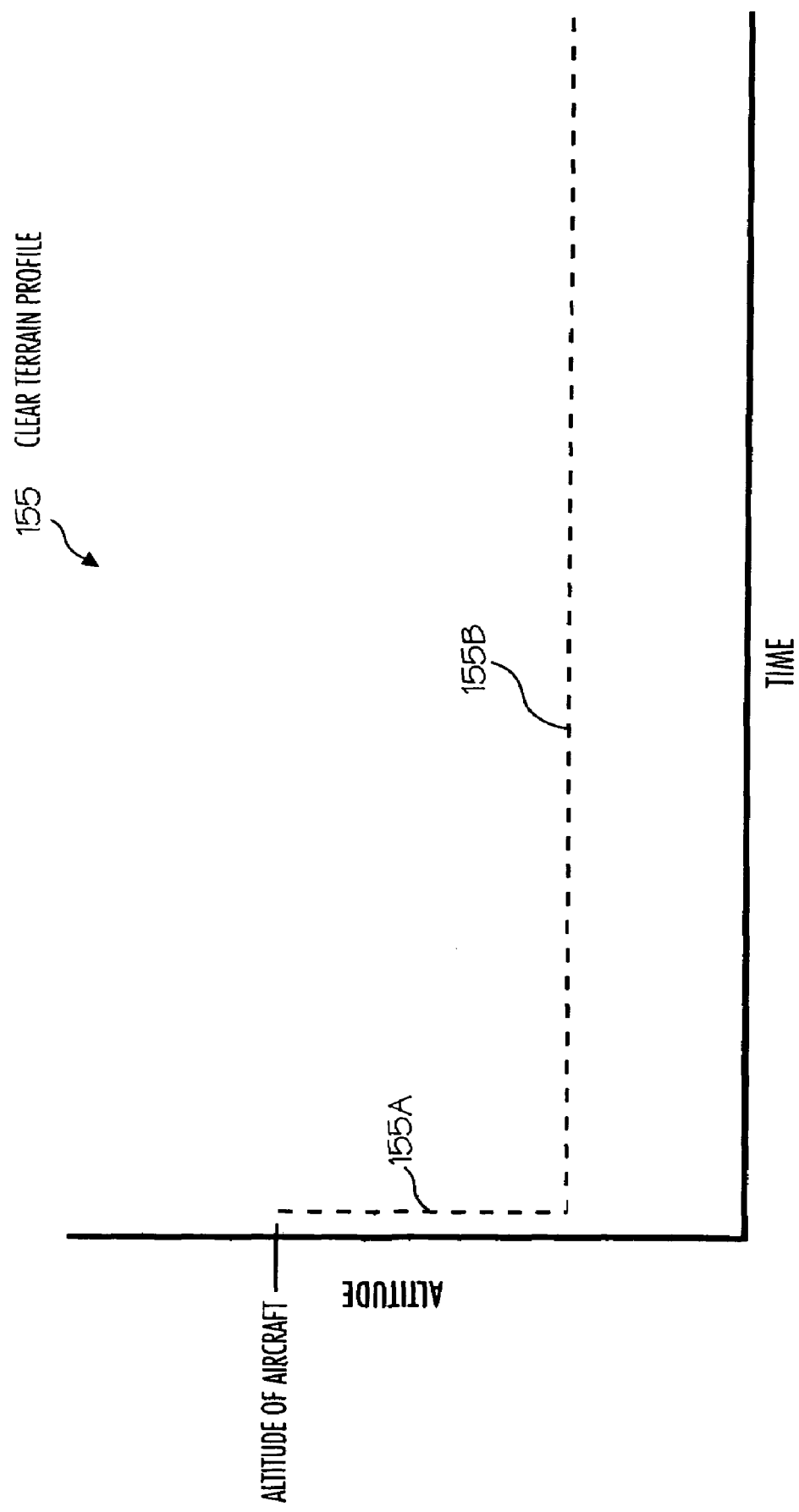
FIG. 4 illustrates an example configuration for a clear terrain profile, in accordance with systems and methods consistent with the present invention.

Turning to FIG. 4, in one embodiment of the invention, clear terrain profile 155 includes two segments: safety buffer segment 155A and terrain check segment 155B. Safety buffer segment 155A has the same purpose as minimum clearance segment 151 of profile 150 (FIG. 3); that is, to provide for a minimum clearance of an aircraft's flight over terrain. Segment 155A projects a desired level of altitude beneath the aircraft to ensure that the aircraft is at a safe altitude above a terrain threat before the pilot is informed that the terrain has been cleared. The altitude at which segment 155A extends below the current altitude of the aircraft is discretionary and may be selected in a manner similar to that discussed with respect to minimum clearance segment 151 (FIG. 3).

Terrain check segment 155B serves the purpose of determining whether a terrain threat is still present during a terrain avoidance maneuver (e.g., pull-up or banking maneuver). Segment 155B preferably extends substantially in a horizontal direction regardless of the climb angle or flight path angle of the aircraft. The length of segment 155B is also discretionary and may be fixed or variable as a function of time, ground speed or other factors. Example shapes and sizes of profiles 150 and 155 are depicted in the appended drawing (FIGS. 3 and 4) for illustrative purposes only. Actual shapes and sizes of such profiles may vary with flight conditions and may be modeled mathematically by a processor of the inventive system, as discussed in greater detail below. Furthermore, while shown separately in FIGS. 3 and 4, terrain avoidance profile 150 may be combined with clear terrain profile 155 to yield a single profile with two segments, i.e., a terrain avoidance segment and a terrain clear segment. In certain embodiments clear terrain profile 155 only relates to checking whether an altitude of a terrain threat has been surpassed, for example the situation discussed in reference to FIG. 2. However, clear terrain profile 155 may, alternatively and/or additionally, be configured and compared to terrain data to determine whether other types of terrain avoidance maneuvers can be ended (for example, when an aircraft may cease banking to avoid a terrain threat, etc.).

Minimum clearance segment 151 (FIG. 3) and/or safety buffer segment 155A (FIG. 4) may optionally be included as part of the respective profiles (i.e., terrain avoidance profile 150 and clear terrain profile 155). However, alternatively, an added safety clearance margin could also be accomplished mathematically by, for example, adding the minimum terrain clearance distance (MTCD) to the elevation of the terrain or subtracting the terrain elevation from the elevations of the sensor profiles 150, 155 and comparing the result to a stored MTCD value. Consequently, a desired MTCD may be: (i) included as part of the sensor profiles 150 and/or 155 for comparison with terrain data as shown by the example illustrations in FIGS. 3-5; (ii) added to the terrain elevation before comparing profiles 150, 155 to the terrain data; and/or (iii) determined by subtracting the terrain elevation from the elevations of the sensor profiles 150, 155 and the resulting difference(s) compared to the MTCD. Although mathematically equivalent, these examples show how an MTCD may be incorporated in varying manners and thus the scope of the present invention is not limited by any particular manner of calculation.

Additionally, FIGS. 3 and 4 illustrate respective sensor profiles 150, 155 from a two-dimensional aspect; that is, only length and height aspects of sensor profiles 150, 155 are illustrated. However, terrain avoidance profile 150 and clear terrain profile 155 each also preferably include a lateral or width aspect defined by respective right and left edges of the sensor profiles that, in connection with the length and height of the profiles, define three-dimensional sensor windows. In one example non-limiting implementation, profiles 150 and/or 155 project outwardly from an aircraft and have right and left sides that are formed at an angle with respect to the track of the aircraft. In essence, the right and left sides of the sensor windows widen as they emanates from the aircraft. In a most preferred embodiment, each of the right and left sides of profile 150, 155 forms a 1.5° angle with the current aircraft track and each angle may increase to a larger value when turning in the direction associated with respective side profile 150, 155.

Figure 5:
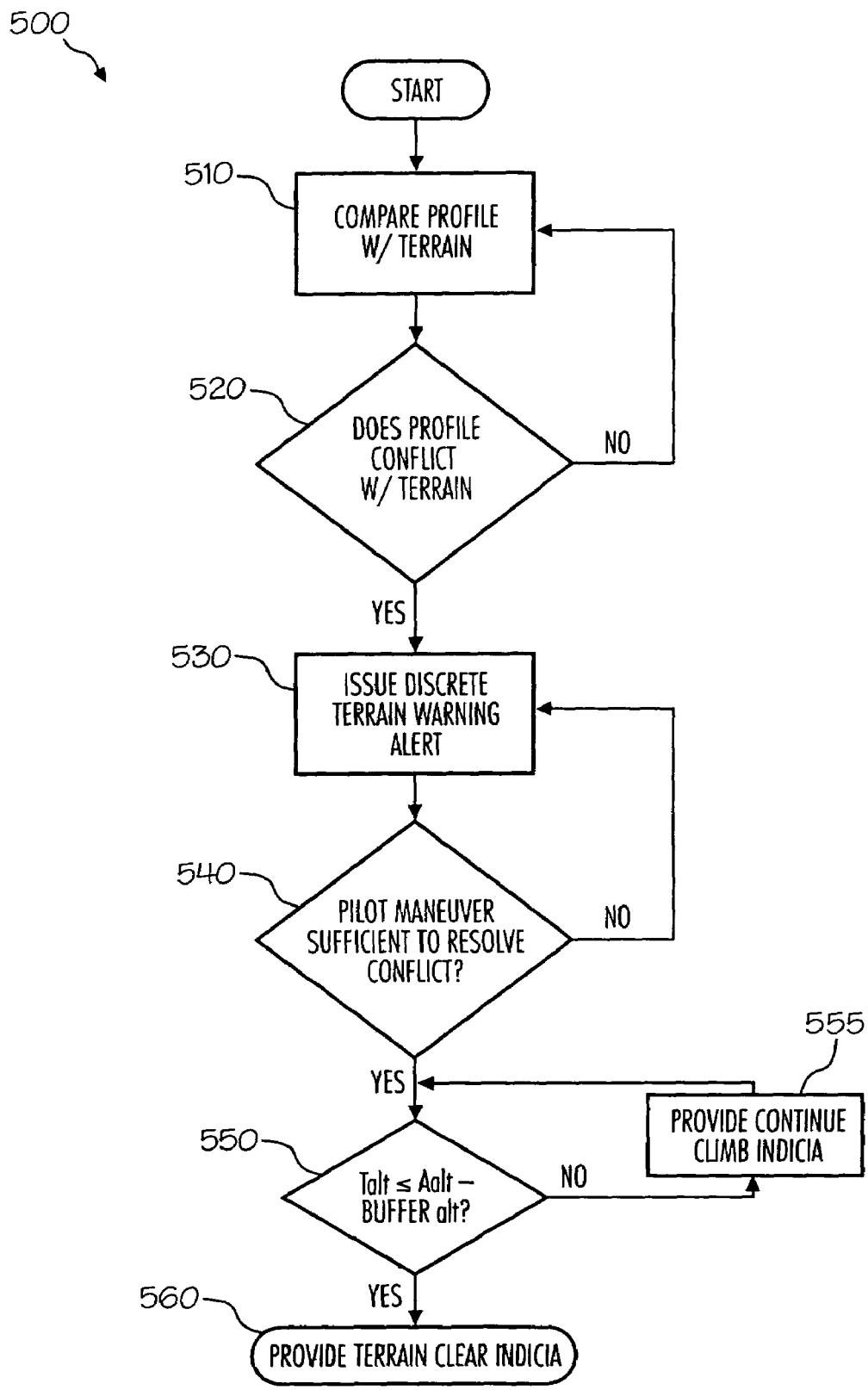
FIG. 5 illustrates a flow chart detailing a method of preventing aircraft collisions with terrain, in accordance with systems and methods consistent with the present invention.

Turning to FIG. 5, a method 500 for preventing collisions between an aircraft and terrain will now be discussed. The TAWS of an aircraft in flight constantly compares 510 projected flight information representing projected position, track, altitude and flight path angle, e.g., terrain avoidance profile 150 (FIG. 3), with available terrain data, e.g., coordinates and associated altitudes of terrain features, stored in a terrain database, as identified by radar imaging, GPS (Global Positioning System) or other known ways of surveying terrain features. If any terrain conflicts 520 with the projected flight path of the aircraft, a terrain alert is issued 530 to the pilot. The alert is preferably consistent with the standard set of visual and aural alerts for caution and/or warning alerts discussed in TSO-C151a. For example, a terrain warning alert may sound an audible indicator such as "Terrain, Terrain; Pull-up, Pull-up." As long as the terrain threat continues to conflict 540 with the projected flight path, then the terrain alert will continues to be indicated 530 to the pilot.

However, if the pilot maneuvers the aircraft so that any conflict between the projected flight path and any terrain feature is resolved 540 (for example, as determined by the terrain avoidance profile no longer intersecting the terrain data model), then the terrain alert may cease or be modified to a lower threat mode. This however, does not necessarily mean that the terrain threat has been traversed, but only that, on its current flight path angle, imminent collision with the terrain no longer exists. During vertical maneuvering to avoid the terrain threat, the altitude of terrain in the immediate track of the aircraft ($T_{alt}$) is compared with the altitude of the aircraft at its current position ($A_{alt}$) (e.g., using clear terrain profile 155 (FIG. 4)). As long as $T_{alt}$ exceeds $A_{alt}$ (for example, the aircraft is climbing up the slope of the terrain) the pilot is NOT informed that the terrain has been traversed. However, during the condition when $T_{alt} > A_{alt}$, the pilot is preferably provided a cautionary status indicator 555, for example, a visual alert such as an amber text message on the terrain display and/or an aural alert indicating the pilot should maintain its current vertical speed or climb angle. Cautionary status indicator may be provided using any visual and/or aural indicia that represents a reduced, but continued potential terrain threat. Alternatively, and or in addition, the indicia provided to indicates that the pilot should continue to climb until terrain cleared.

When $A_{alt}$ exceeds $T_{alt}$ (preferably plus a minimum allowed terrain clearance, e.g., five hundred feet above $T_{alt}$) the pilot is informed that the terrain threat has been cleared 560 using any appropriate aural or visual indicia. When the terrain clear indicator or indicia are provided, the pilot will know that it is safe to level the aircraft from its terrain-avoiding ascent.

As mentioned previously, there are several possible types of calculations for including the minimum terrain clearance distance (MTCD), for example, in addition to that shown, $A_{alt} > T_{alt} + \text{buffer}$, or $A_{alt} - T_{alt} > \text{buffer}$. Accordingly, method 500 is not limited to any particular algorithm.

Referring to FIG. 6, a block diagram of a system for preventing collisions between aircraft and terrain will now be described. System 600 preferably includes terrain information source 610, flight data source 620, processing device 630, memory device 640 and at least one output device, e.g., video output 652, audio output 654 and/or performance database 670. Processing device functions to compare terrain and flight information from sources 610, 620 and optionally, 670, according to instructions stored in memory 640 to evaluate the risk of potential collision with terrain and alert a pilot of the same on output device 652 and/or 654. In a modified embodiment, system 600 also includes a control unit 660 for controlling sensitivity, display, volume and/or other settings.

Terrain information source 610, flight data source 620, and optional, aircraft performance database 670 provide the information and data inputs 602 for operation of system 600. Terrain processing device 630 and memory 640 from processing system 605 that utilizes information from inputs 602 for comparing and/or storing the terrain avoidance and clear terrain profiles with modeled terrain features and generating alerts.

Terrain information source 610 provides information to processing device 630 regarding coordinates and altitudes of naturally occurring terrain and man-made obstacles, collectively referred to herein as "terrain". Terrain information source 610 may be any single device or combination of devices for accomplishing this end including, for example, a database comprising a model of terrain stored in a memory or receiver obtaining information regarding surrounding terrain over a wireless communications link such as a transponder.

Flight data source 620 functions to provide information to processing device 630 regarding current flight information such as altitude, bearing, ground speed, and vertical speed. Flight data source 620 may be any single device or combination of devices for serving this purpose including, for example, one or more altimeters, a global positioning receiver, a gyroscope, air data computer, a traffic collision and avoidance system (TCAS) and the like.

Processing device 630 serves to compare flight and terrain data from sources 610, 620 and optionally database 670 and generate output information to inform a pilot of potential terrain threats. The terrain avoidance profile 150 (FIG. 3) and terrain clearance profile 155 (FIG. 4) discussed previously are generated by processing device 630 and compared to corresponding terrain information to determine potential collision threats. Any single processing device or combination of devices may be used for this purpose, for example, a computer microchip, micro-controller, programmable logic array or combination thereof may be used.

Memory 640 stores machine-readable code to be executed by processing device 630. Memory 640 may function as a Random Access Memory, Read Only Memory, storage buffer or other memory function for storing control settings, temporary information, constants, equations or other information necessary for processing the information and generating alert signals as described herein. Memory 640 may be a single device or combination of devices for accomplishing this purpose and may be integrated or partially integrated with processing device 630. Memory 640 may be a fixed memory or portable memory and may even serve as terrain information source 610, e.g., a terrain database stored in a physical memory device or conduit for flight data information.

Output devices 652 and 654 serve the purpose of providing information about terrain to a pilot and function to convert electrical signals generated by processing device 630 and/or other devices into light or sound. Any single device or combination of devices that accomplish this function can be used, for example, a transducer, an analog display, a digital display, an L.E.D., and/or a laser. In a preferred embodiment, an analog speaker is used for outputting aural indicia and a display device such as a cockpit display or other electronic flight instrument system display may be used to output visual indicia.

System 600 may be an integrated device, discreet components of a shared system, or other type of processing configuration able to perform the functions described herein. System 600 calculates, if not fixed values, the terrain avoidance profile and clear terrain profile of the types previously discussed, and compares the profiles with values obtained from terrain information source 610 to generate caution alerts, warning alerts, clear terrain indicia as previously discussed. In a preferred embodiment, a terrain avoidance profile (e.g. profile 150 in FIG. 3) is calculated using aircraft performance information stored in database 670. This performance information stored in database 670 may be fixed aircraft specific information, information stored regarding recently demonstrated flight characteristics, varying flight performance information, or any combination thereof.

Since conventional TAWS also utilize a processor and software for comparing conventional terrain avoidance profiles with terrain information, modifying these systems to perform in accordance with minimum aspects of the present invention can be accomplished by updating terrain avoidance software.

Figure 7:
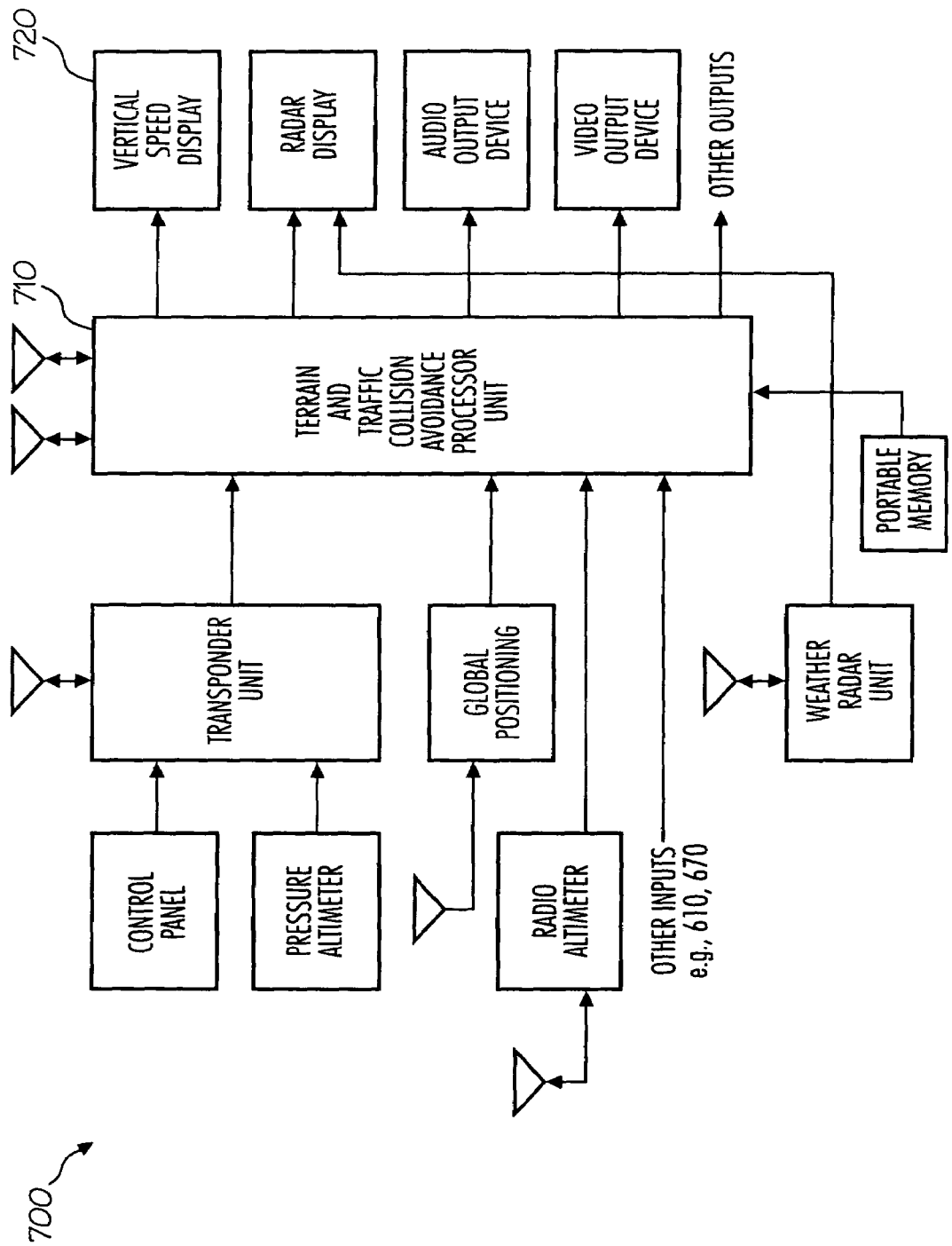
FIG. 7 illustrates a block diagram of an exemplary system for preventing aircraft collisions, in accordance with systems and methods consistent with the present invention.

Turning to FIG. 7, an exemplary system 700 of the invention will now be described. Processor 710 includes the general block features described with reference to system 600 and further provides functions for traffic awareness and collision avoidance (referred to herein as "TCAS"). Conventionally, most aircraft include two separate collision avoidance systems; one for terrain (TAWS) and one for aircraft traffic (TCAS). These two types of systems, which are conventionally entirely separate from each other with the exception of prioritization of warnings, are combined into an integrated system 700. One major advantage of this integration includes a substantial savings in equipment space and overall system weight. Additional advantages are also obtained from TCAS and TAWS integration, such as the potential capability to coordinate terrain avoidance maneuvers with surrounding air traffic. Terrain and traffic collision avoidance processor unit 710 consequently performs the processing and/or potentially the memory functions described in respect to system 600 (FIG. 6) as well as processing required for tracking surrounding air traffic and generating Traffic Alerts (TAs) and Resolution Advisories (RAs) commonly performed by traffic collision avoidance systems.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for preventing controlled flight into terrain, the method comprising:
    providing a first indicator to a pilot of an aircraft that a threat of potential collision with terrain exists;
    providing a second indicator to the pilot of the aircraft that the threat no longer exists;
    comparing with a processor, a terrain avoidance profile with terrain information to determine whether the threat exists, the terrain avoidance profile including a climb gradient profile portion based on a recently-demonstrated flight performance characteristic of the aircraft; and
    comparing with the processor, a clear terrain profile with the terrain information to determine whether the threat no longer exists.

2. The method of claim 1 wherein the first indicator comprises an aural alert instructing the pilot to maneuver to avoid the threat and wherein the second indicator comprises an aural alert identifying that the threat no longer exists.

3. The method of claim 1 wherein the clear terrain profile includes an altitude safety margin.

4. The method of claim 2 wherein the terrain avoidance profile comprises a projected flight path portion.

5. The method of claim 4 wherein the climb gradient profile portion is based on at least one performance characteristic of the aircraft.

6. The method of claim 2 wherein the first and second indicators further comprise respective visual alerts on one or more displays.

7. The method of claim 5 wherein the at least one performance characteristic comprises one or more published performance characteristics of the aircraft.

8. The method of claim 5 wherein the at least one performance characteristic comprises at least one dynamic performance characteristic.

9. The method of claim 4 wherein the projected flight path portion includes a pilot reaction time segment.

10. The method of claim 1 wherein providing the first and second indicators comprises comparing one or more terrain profiles with terrain position and altitude information.

11. The method of claim 10 wherein the one or more terrain profiles comprises a terrain avoidance profile and a terrain clearance profile.

12. An apparatus for monitoring potential aircraft collision threats with terrain, the apparatus comprising:
- a memory storing machine readable code; and
- a processor when processing the stored machine readable code in said memory is operative to:
  - (a) compare a terrain avoidance profile with terrain information to identify a potential collision threat, the terrain avoidance profile including a climb gradient profile portion based on a recently-demonstrated flight performance characteristic of the aircraft;
  - (b) generate a terrain warning signal when the potential collision threat is identified;
  - (c) compare a forward projection of current aircraft altitude with the terrain information to identify if a terrain threat has been avoided; and
  - (d) generate a terrain clear signal when the terrain threat has been avoided.

13. The apparatus of claim 12 wherein the processing device comprises a ground collision avoidance system processor mounted in the aircraft.

14. The apparatus of claim 13 wherein the processing device further processes traffic collision avoidance system information for preventing collisions with surrounding aircraft.

15. A system for avoiding aircraft collisions with terrain, the system comprising:
- storage means for storing information relating to terrain features;
- processing means for:
  - (a) comparing a terrain avoidance profile with the information stored in said storage means, wherein the terrain avoidance profile includes a climb gradient profile portion based on a recently-demonstrated flight performance characteristic of the aircraft;
  - (b) generating an alert signal based upon said comparison if said comparison indicates a potential threat;
  - (c) comparing a clear terrain profile with said information when said alert signal has been generated; and
  - (d) generating a terrain clear signal when said terrain clearance profile does not conflict with said information.

16. The system of claim 15 further comprising output means for converting the alert signal and the terrain clear signal to at least one of an audible and visual form.

17. The system of claim 15 further comprising input means for providing inputs to the processor means regarding at least one of aircraft flight data and aircraft performance information.

18. The system of claim 15 wherein the processing means further serve for comparing surrounding aircraft traffic data to flight data to determine potential collisions with surrounding aircraft traffic.

19. The method of claim 1 wherein the clear terrain profile includes a terrain check segment that is independent of a climb angle for the aircraft and a flight path angle for the aircraft.

20. The method of claim 1 wherein the climb gradient profile is further based on a known deficiency in the aircraft's performance.

21. The apparatus of claim 12 wherein the climb gradient profile is further based on a known deficiency in the aircraft's performance.

22. The system of claim 15 wherein the climb gradient profile is further based on a known deficiency in the aircraft's performance.

* * * * *